United States Patent [19]
Melton et al.

[11] 3,758,574
[45] Sept. 11, 1973

[54] N-(ARALKYL) MALONAMIDE DERIVATIVES

[75] Inventors: Timothy Melton, Harlow; David Edward Thorne, Crowthorne, both of England

[73] Assignee: Beecham Group Limited, Brentford, Middlesex, England

[22] Filed: Oct. 21, 1971

[21] Appl. No.: 191,540

[30] Foreign Application Priority Data
Oct. 22, 1970  Great Britain.................. 50,169/70

[52] U.S. Cl...... 260/558 A, 260/471 R, 260/518 R, 260/518 A, 260/519 R, 260/544 M, 260/544 Y, 260/546, 260/559 A, 424/324

[51] Int. Cl........................................... C07c 103/32

[58] Field of Search............................ 260/558, 562

[56] References Cited
UNITED STATES PATENTS
2,765,337   10/1956   de Benneville et al. ............ 260/562

Primary Examiner—Harry I. Moatz
Attorney—Jacobs & Jacobs

[57] ABSTRACT

N-aralkyl-N'-alkylmalonamides and N-aralkyl-N',N'-dialkyl-malonamides are useful as CNS depressants and anti-convulsants.

18 Claims, No Drawings

N-(ARALKYL) MALONAMIDE DERIVATIVES

This invention relates to compounds having pharmacodynamic activity and to a process for their preparation. The invention is especially concerned with compounds having central nervous system (C.N.S.) activity particularly CNS depressant and anti-convulsant activity, and in some cases antidepressant activity.

During the course of our investigations into the CNS activity of a large number of compounds, we have noted a group of compounds which are diamide derivatives of malonic acid or substituted malonic acids. Preliminary tests on representative members of this group indicate that CNS activity is a general characteristic of the group.

According to the present invention there is provided a compound of formula (I):

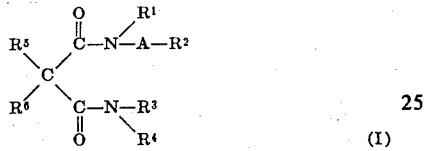
(I)

wherein $R^1$ is hydrogen or lower alkyl; $R^2$ is substituted phenyl; $R^3$ and $R^4$ are the same or different and each is hydrogen or lower alkyl, $R^5$ and $R^6$ are the same or different and each is hydrogen, aralkyl or lower alkyl and A is an alkylene group having one or two carbon atoms.

In the present specification the term "lower alkyl" means an alkyl group having from one to seven carbon atoms. In addition, the term "alkyl" includes straight chain alkyl groups, branched chain alkyl groups and cycloalkyl groups.

In the definition of the compounds of this invention it will be noted that $R^2$ is substituted phenyl. Examples of substituents include halogen groups; lower alkyl groups; haloalkyl groups such as trifluoromethyl; alkenyl groups such as allyl; the hydroxy group and its derivatives such as alkoxy, aralkoxy, acyloxy, carbamate, carbonate, basic ether and basic ester groups and also metal salts such as the sodium salt; primary, secondary and tertiary amino groups and also acid addition and quaternary salts of such amino groups.

One specific compound of this invention is N-(o-chlorobenzyl)-N', N'-dimethylmalonamide. The compound is a CNS depressant which depresses spontaneous locomotor activity and potentiates hexobarbitone narcosis in mice. The compound has some anti-aggressive activity in rats and mice and also has anti-convulsant properties.

A compound of this invention which has antidepressive activity is N-2-(o-chlorophenyl-ethyl)-N', N'-dimethyl malonamide.

The present invention also includes pharmaceutical compositions comprising a compound of formula (I) together with one or more pharmaceutically acceptable carriers or excipients.

One method for the preparation of the compounds of this invention comprises the reaction of an acid of formula (II) or a reactive derivative thereof:

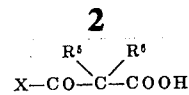
(II)

with an amine of formula (III)

$$H Y$$ (III)

in which formulae one of the groups X and Y represents the group

while the other represents the group

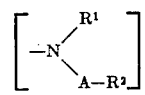

$R^1$, $R^2$, $R^3$ and $R^4$ having the meanings ascribed to them in formula (I).

The reactive derivative of the acid (II) may be an acid halide such as the chloride or bromide, an anhydride or mixed anhydride or an ester with an alcohol or phenol. We find that the reaction generally proceeds smoothly when the ethyl ester of the acid (II) is treated with the amine (III) and the reaction mixture is allowed to stand for a time up to several days. Where an acid halide is used, an acid binding agent such as an organic or inorganic base is preferably present in the reaction mixture. If the free acid (II) itself is used, a dehydrating agent, e.g. a carbodiimide such as dicyclohexyl-carbodiimide, may be necessary to effect the desired reaction. It will of course be understood that any substituents present in the reactants (II) and (III) which might interfere in the reaction should be protected in the usual ways.

The acids of formula (II) may be prepared by reacting one of the carboxyl groups of the acid (IV):

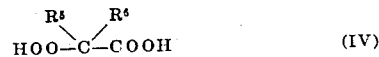
(IV)

wherein $R^5$ and $R^6$ are as defined in formula (I) with an amine of the formula HX or HY wherein X and Y are as defined in formulae (II) and (III). In order to prevent the reaction of the amine HX or HY with the second carboxyl group of the acid (IV) it will generally be necessary to protect the second carboxyl group, for example by forming an ester which is unreactive under the reaction conditions employed. The reaction of the first carboxyl group of the acid (IV) with the amine HX or HY may be effected by any of the usual methods. Thus the first carboxyl group can be converted to acid halide, anhydride, mixed anhydride or a reactive ester before reaction with the amine HX or HY, or alternatively, the free carboxyl group can be reacted with the amine HX or HY in the presence of a dehydrating agent such as dicyclohexyl-carbodiimide.

If desired, alkyl or aralkyl groups $R^5$ and $R^6$ may be introduced at a later stage, e.g. by first preparing the corresponding compound where $R^5=R^6=H$ and then reaction with a strong base such as sodium hydride and the appropriate alkyl or aralkyl iodides The following Examples illustrate the preparation of the compounds of this invention.

EXAMPLE 1

N-(o-Chlorobenzyl)-N',N'-dimethylmalonamide a. Diethyl malonate (250 g) in ethanol (500 ml) was treated with potassium hydroxide (87.5 g) in ethanol (600 ml). The reaction mixture was stirred for four hours at room temperature and brought to reflux for one minute. The white solid which formed on cooling, potassium ethyl malonate, was filtered off, washed with ethanol and dried.

This salt was suspended in water (80 mls), acidified with concentrated hydrochloric acid and ether extracted four times. The combined ethereal extracts were dried with $MgSO_2$, the solvent removed and the residue fractionated.

Yield 163 g (74%); $n_D^{22.5}$ 1.4200 b. Monoethyl malonate (400 g) in dichloromethane (1250 ml) was added slowly with stirring to o-chlorobenzylamine (439 g) and N,N'-dicyclohexylcarbodiimide (625 g) in dichloromethane (500 ml). The reaction mixture was stirred for 3 hours at room temperature and then refluxed for one hour. When cool, the urea formed was filtered off, the solvent removed and the residue crystallised from ethanol to yield ethyl-N-(o-chlorobenzyl)malonamate (578 g., 74 percent) mp 66°–67°C.

c. The above mono-amide (390 g), anhydrous dimethylamine (1950 g) and ethanol (2340 ml) were left to stand for 7 days at room temperature in a sealed flask. The solvent and excess dimethylamine were then distilled off and the residue crystallised from acetone to give N-(o-chlorobenzyl)-N',N'-dimethylmalonamide (180 g., 46 percent) mp 96°–97°C (Found: C56.8; H,6.1; Cl,N,11.0 $C_{12}H_{15}N_2ClO_2$ requires C, 56.5; H,5.9; Cl, 14.0; N,11.0%.

EXAMPLE 2

N-(m-Chlorobenzyl)-N',N'-dimethylmalonamide

A mixture of m-chlorobenzylamine (14.2 g) and N,N'-dicyclohexylcarbodiimide (20.6 g) in dichloromethane (200 ml) was treated with monoethyl malonate (13.2 g) in dichloromethane (50 ml) as in Example 1, to yield ethyl m-chlorobenzylmalonamate (16.2g, 63%), m.p. 63°–64°,after crystallisation from ethyl acetate.

The malonamate (10 g) with an excess of dimethylamine in ethanol gave N-(m-chlorobenzyl) -N',N'-dimethylmalonamide (3.9 g, 40 percent), m.p. 91°–92° on crystallisation from acetone. (Found: C, 56.9; H, 6.2; N, 11.1; Cl, 13.8. $C_{12}H_{15}N_2ClO_2$ requires C, 56.5; H, 5.9; N, 11.0; Cl, 14.0 percent).

EXAMPLE 3

N-(p-Chlorobenzyl)-N',N'-dimethylmalonamide

Following the procedure in Example 1, a mixture of p-chlorobenzylamine (14.2 g) and N,N'-dicyclohexylcarbodiimide (20.6 g) with monoethyl malonate (13.2 g) in dichloromethane (250 ml) gave ethyl p-chlorobenzyl malonamate (13.6 g, 54 percent, m.p. 78°–79°, after crystallisation from ethyl acetate.

The malonamate (10 g) with an excess of dimethylamine in ethanol, followed by crystallisation from acetone, yielded N-(p-chlorobenzyl)-N',N'-dimethylmalonamide (8.6 g, 86 percent), m.p. 119°–120°, (Found: C, 56.9; H, 6.0; N, 11.1; Cl,13.7. $C_{12}H_{15}N_2ClO_2$ requires C, 56.5; H, 5.9; N, 11.0; Cl, 14.0%).

EXAMPLE 4

N-(o-Chlorobenzyl)-N'-methylmalonamide

Treatment of ethyl o-chlorobenzylmalonamate (10 g) prepared as in Example 1 with excess methylamine in ethanol, followed by crystallisation from acetone gave N-(o-chlorobenzyl)-N'-methylmalonamide (5.5 g, 65 percent), m.p. 117°–118°, (Found: C, 54.9; H, 5.4; N, 11.4; Cl, 14.4. $C_{11}H_{13}N_2ClO_2$ requires C, 52.8; H, 5.7; N, 12.2; Cl, 15.5 percent.

EXAMPLE 5

N-(2-(o-Chlorophenyl)ethyl)-N',N'-dimethylmalonamide

Following the procedure in Example 1, β-(o-chlorophenyl)ethylamine (15.5 g) and N,N'-dicyclohexylcarbodiimide (20.6 g) with monoethyl malonate (13.2 g) in dichloromethane (250 ml) yielded crude ethyl o-chlorophenylethylmalonamate as an oil (20.6 g).

The malonamate with excess dimethylamine in ethanol gave, after column chromatography with a benzene/chloroform mixture N-(2-(o-chlorophenyl)ethyl)-N',N'-dimethylmalonamide (13.5 g, 60 percent) as a yellow oil, (Found: C, 55.8; H, 6.1; N, 9.7; Cl, 16.3. $C_{13}H_{17}N_2ClO_2$ requires C, 58.2; H, 6.3; N, 10.4; Cl, 13.2 percent).

EXAMPLE 6

N-(o-Fluorobenzyl)-N',N'-dimethylmalonamide

Following the procedure in Example 1, a mixture of o-fluorobenzylamine (12.5 g) and N,N'-dicyclohexylcarbodiimide (20.6 g) with monoethyl malonate (13.2 g) in dichloromethane (250 ml), yielded (as a red oil) crude ethyl N-(o-fluorobenzyl)malonamate (19.6 g).

The malonamate (19 g) with an excess of dimethylamine in ethanol, followed by crystallisation from ethanol, gave N-(o-fluorobenzyl)-N',N'-diemthylmalonamide (4.9 g., 20 percent) m.p. 76°–77°, (Found: C, 60.4; H, 6.3; N,11.7; $C_{12}H_{15}N_2FO_2$ requires C, 60.25; H, 6.7; N, 11.7 percent).

EXAMPLE 7

N-(o-Bromobenzyl)-N',N'-dimethylmalonamide

Following the procedure in Example 1, a mixture of o-bromobenzylamine (18.6 g) and N,N'-dicyclohexylcarbodiimide (20.6 g) with monoethyl malonate (13.2 g) in dichloromethane yielded crude ethyl o-bromobenzylmalonamate (33 g) as a red oil.

The crude malonamate (32 g) was treated with an excess of dimethylamine in ethanol, followed by crystallisation at 0° from acetone, to yield N-(o-bromobenzyl)N',N'-dimethylmalonamide (1.9 g, 7 percent), m.p. 116°–117°, (Found: C, 48.5; H, 5.0; N, 9.3; $C_{12}H_{15}N_2BrO_2$ requires C, 48.2; H, 5.0; N, 9.4 percent).

EXAMPLE 8

N-(2,6-Dichlorobenzyl)-N',N'-dimethylmalonamide

Following the procedure outlined in Example 1, a mixture of 2,6-dichlorobenzylamine (8.8 g) and N,N'-dicyclohexylcarbodiimide (10.3 g) with monoethyl malonate (6.6 g) in dichloromethane (125 ml) yielded ethyl dichlorobenzylmalonamate (8.8 g, 63 percent), m.p. 131°–132°, after crystallisation from ethanol.

The malonamate (8.0 g) with an excess of dimethylamine in ethanol, followed by crystallisation from ethyl acetate, gave N-(2,6-dichlorobenzyl)-N',N'-dimethylmalonamide (6.7 g, 84 percent), m.p. 144°–145°. (Found: C, 49.8; H, 4.8; N, 9.2; Cl, 25.0. $C_{12}H_{14}N_2Cl_2O_2$ requires C, 49.6; H, 4.8; N, 9.7; Cl, 24.6 percent).

EXAMPLE 9

N-(o-Trifluoromethylbenzyl)-N',N'-dimethylmalonamide

Following the procedure in Example 1, a mixture of o-trifluoromethylbenzylamine (5.8g) and N,N'-dicyclohexylcarbodiimide (7.0 g) with monoethyl malonate (4.4 g) in dichloromethane (90 ml), yielded crude ethyl o-trifluorobenzyl-malonamate (8.8 g) as a red oil.

The malonamate (8.8 g) with an excess of dimethylamine in ethanol, followed by crystallisation from ethyl acetate, gave N-(o-trifluoromethylbenzyl)-N',N'-dimethylmalonamide (4.7 g, 50 percent), m.p. 122°–123°, (Found: C, 55.2; H, 5.6; N, 9.9. $C_{13}H_{15}N_2F_3O_2$ requires C, 54.2; H, 5.2; N, 9.7 percent).

EXAMPLE 10

N-(o-Methoxybenzyl)-N',N'-dimethylmalonamide

Following the procedure in Example 1, a mixture of o-methoxybenzylamine (3.41 g) and N,N'-dicyclohexylcarbodiimide (5.1 g) with monoethyl malonate (3.3 g) in dichloromethane (62 ml) yielded crude ethyl o-methoxybenzylmalonamate (3.9 g) as a red oil.

The malonamate (3.8 g) with an excess of dimethylamine in ethanol, followed by column chromatography with chloroform, gave N-(o-methoxybenzyl)-N',N'-dimethylmalonamide (2.0 g, 33 percent) as a yellow oil, (Found: C, 63.1; H. 7.4; N, 11.0. $C_{13}H_{18}N_2O_3$ requires C, 62.4; H, 7.2; N, 11.2 percent).

EXAMPLE 11

N-(o-Chlorobenzyl)-N',N'-diethylmalonamide

Ethyl o-chlorobenzylmalonamate (2.55 g) (prepared as in Example 1) in ethanol (10 ml) was treated with potassium hydroxide (0.56 g) in ethanol (10 ml) for 24 hours. The solvent was removed *in vacuo*, the remaining solid dissolved in water (10 ml) and concentrated hydrochloric acid (1 ml) added. The solution was extracted with ether, the combined ether layer dried (MgSO$_4$) and the solvent removed. Crystallisation of the remaining solid from ethyl acetate gave N-(o-chlorobenzyl)malonamic acid (1.62 g, 72 percent), m.p. 105°–106°, (Found: C,52.7; H, 4.3; N, 6.1; Cl, 15.65, $C_{10}H_{10}NClO_3$ requires C, 52.8; H, 4.4; N, 6.2; Cl, 15.6 percent).

The malonamic acid (2.27 g) in dichloromethane (5 ml) was added dropwise to a mixture of diethylamine (0.73 g) and N,N'-dicyclohexyl-carbodiimide (2.06 g) in dichloromethane (20 ml). The mixture was stirred for two hours at ambient temperature and then heated under reflux for one hour. After cooling in an ice-bath and filtering off the dicyclohexylurea, the remaining solution was evaporated to dryness. The residual solid was crystallised from ethyl acetate to yield N-(o-chlorobenzyl)-N',N'-diethylmalonamide isolated as the monohydrate (0.44 g, 16 percent), m.p. 123°–124°, (Found: C, 56.75; H, 7.35, N,9.3; Cl, 11.75. $C_{14}H_{14}N_2ClO_2 \cdot H_2O$ requires C, 56.0; H, 7.0; N, 9.3- Cl, 11.8 percent).

EXAMPLE 12

N-(o-Chlorobenzyl)-N',N'-dimethylethylmalonamide

A solution of N-(o-chlorobenzyl)-N,N-dimethylmalonamide (2.55 g) in dry benzene (20 ml) was added dropwise to a suspension of sodium hydride (0.4 g, 60 percent dispersion) in dry benzene (20 ml) over 10 mins. Ethyl iodide (1.55 g) in dry benzene (10 ml) was then added in one portion, and the mixture stirred for 2 hours and then refluxed for one hour. A solid precipitated during the reaction, which was filtered off, and the remaining solution washed with water. The benzene extract was dried and the solvent removed to give, after chromatography with a chloroform/benzene mixture, N-(o-chlorobenzyl)-N',N'-dimethylethylmalonamide (1.1 g, 36 percent), m.p. 83°–84°, (Found: C, 59.4; H, 6.9; N, 9.8; Cl, 13.3. $C_{14}H_{19}N_2O_2Cl$ requires C,59.6; H, 6.7; N, 10.0, Cl, 12.5 percent).

EXAMPLE 13

N-(o-Chlorobenzyl)-N',N'-dimethylbenzylmalonamide

Treatment of N-(o-chlorobenzyl)-N,N-dimethylmalonamide with sodium hydride and benzyl bromide following the procedure in Example 12, gave N-(o-chlorobenzyl)-N',N'-dimethylbenzyl-malonamide (2.0 g, 58 percent), m.p. 133°–134°, ex.ethyl acetate, (Found: C, 65.9; H, 6.1; N, 8.4; Cl,10.2, $C_{19}H_{21}N_2O_2El$ requires C, 66.3; H, 6.1; N, 8.1; Cl, 10.3 percent).

EXAMPLE 14.

By the same method outlined in Example 1, the following compounds were prepared.

| Compound | Yield % | Nitrogen Analysis Required | Found | M.pt. °C |
|---|---|---|---|---|
| N-[2-(p-Chlorophenyl)ethyl]-N'-methylmalonamide | 41 | 11.00 | 10.91 | 165.7 |
| N-[2-(p-Chlorophenyl)ethyl],N',N'-dimethyl-malonamide | 45 | 10.42 | 10.50 | 97.1 |
| N-[2(p-Methoxyphenyl)ethyl]-N'-methylmalonamide | 38 | 11.19 | 10.84 | 135.6 |
| N-[2-(p-Methoxyphenyl)ethyl]-N',N'-dimethyl-malonamide | not recorded | 10.60 | 10.36 | oil |
| N(p-Methoxybenzyl)-N'-methylmalonamide | 63 | 11.86 | 12.30 | 128.9 |
| N-(p-Methoxybenzyl)-N',N'-dimethylmalonamide | 64 | 11.19 | 11.57 | 100.2 |
| N-[2-(3,4-Dimethoxyphenyl)ethyl]-N'-methylmalonamide | 44 | 10.00 | 10.36 | 121.2 |
| N-[2-(3,4-Dimethoxyphenyl)ethyl]-N',N'-dimethyl-malonamide | not recorded | 9.52 | 9.08 | oil |
| N-(p-Chlorobenzyl)-N'-methyl-malonamide | 53 | 11.65 | 11.56 | 165.6 |

We claim:
1. N-(o-Chlorobenzyl)-N',N'-dimethylmalonamide.
2. N-[2-(o-chlorophenyl)ethyl]-N',N'-diemthyl-malonamide.

3. N-(m-Chlorobenzyl)-N',N'-dimethylmalonamide.
4. N-(p-Chlorobenzyl)-N',N'-dimethylmalonamide.
5. N-(o-Fluorobenzyl)-N',N'-dimethylmalonamide.
6. N-(o-Bromobenzyl)-N',N'-dimethylmalonamide.
7. N-(2,6-Dichlorobenzyl)-N',N'-dimethylmalonamide.
8. N-(o-Trifluoromethylbenzyl)-N',N'-dimethylmalonamide.
9. N-(o-Methoxybenzyl)-N'-,N'-dimethylmalonamide.
10. N-(o-Chlorobenzyl)-N',N'-diethylmalonamide.
11. N-[2-(p-Chlorophenyl)ethyl]-N'-methylmalonamide.
12. N-[2(p-Chlorophenyl)ethyl],N',N'-dimethylmalonamide.
13. N-[2-(p-Methoxyphenyl)ethyl]-N'-methylmalonamide.
14. N-[2(p-Methoxyphenyl)ethyl]-N',N'-dimethlymalonamide.
15. N-(p-Methoxybenzyl)-N'-methylmalonamide.
16. N-(p-Methoxybenzyl)-N',N'-dimethylmalonamide.
17. N-[2(3,4-Dimethoxyphenyl)ethyl]-N'-methylmalonamide.
18. N-[2-(3,4-Dimethoxyphenyl)ethyl]-N',N'-dimethylmalonamide.

* * * * *